United States Patent
Lievens et al.

(10) Patent No.: US 9,866,894 B2
(45) Date of Patent: Jan. 9, 2018

(54) METHOD FOR ANNOTATING AN OBJECT IN A MULTIMEDIA ASSET

(71) Applicant: Alcatel Lucent, Boulogne-Billancourt (FR)

(72) Inventors: Sammy Lievens, Antwerp (BE); Donny Tytgat, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/105,868

(22) PCT Filed: Dec. 11, 2014

(86) PCT No.: PCT/EP2014/077333
§ 371 (c)(1),
(2) Date: Jun. 17, 2016

(87) PCT Pub. No.: WO2015/091192
PCT Pub. Date: Jun. 25, 2015

(65) Prior Publication Data
US 2016/0323627 A1    Nov. 3, 2016

(30) Foreign Application Priority Data

Dec. 17, 2013  (EP) ..................... 13306744

(51) Int. Cl.
*H04N 21/431*    (2011.01)
*H04N 21/44*    (2011.01)
(Continued)

(52) U.S. Cl.
CPC ....... *H04N 21/431* (2013.01); *G06K 9/00718* (2013.01); *H04N 21/44008* (2013.01); *H04N 21/8456* (2013.01); *H04N 21/8586* (2013.01)

(58) Field of Classification Search
CPC ........... H04N 21/431; H04N 21/44008; H04N 21/8456
See application file for complete search history.

(56) References Cited

U.S. PATENT DOCUMENTS

| | | | |
|---|---|---|---|
| 2009/0129755 A1* | 5/2009 | Rakib | G06F 17/30781 386/241 |
| 2015/0248586 A1* | 9/2015 | Gaidon | G06K 9/00711 382/103 |

FOREIGN PATENT DOCUMENTS

| | | |
|---|---|---|
| JP | 2008067139 A | 3/2008 |
| JP | 2011059898 A | 3/2011 |
| JP | 2012524343 A | 10/2012 |

OTHER PUBLICATIONS

Pascal Bertolino et al., "Building and Using Hypervideos," WACV '98, Proceedings, Fourth IEEE Workshop on Princeton, NJ, USA, IEEE Comp. Soc., pp. 276-277, XP010315574, 1998.

(Continued)

*Primary Examiner* — Sumaiya A Chowdhury
(74) *Attorney, Agent, or Firm* — Harness, Dickey & Pierce, P.L.C.

(57) ABSTRACT

The present invention relates to a method, system and related devices for annotating an object in a multimedia asset, where the multimedia asset comprises at least one image. The method comprises the steps of first determining a category of the object in an image of the multimedia asset by means of classifying the object and subsequently selecting based on the category of the object an appropriate object detector model from at least one object detector model associated with said category. Thereafter a location of the object in the image of the multimedia asset is determined based on the object detector model that is selected, where the object detector model corresponds to the object which step is followed by segmenting the object detected in the image of the multimedia asset based on the location of the object within the said image and optionally based on the object detector. Finally, the object within the image being segmented is annotated with a hyperlink.

9 Claims, 3 Drawing Sheets

(51) Int. Cl.
*H04N 21/845* (2011.01)
*G06K 9/00* (2006.01)
*H04N 21/858* (2011.01)

(56) References Cited

OTHER PUBLICATIONS

Qurban A. Memon et al., "Object-Database Approach for a Hypervideo Platform," Malaysian Journal of Computer Science, vol. 16, No. 2, pp. 73-80, XP055123036, Dec. 2003.
Jason McC. Smith et al., "An Extensible Object Tracking Architecture for Hyperlinking in Real-time and Stored Video Streams," Technical Report TR02-017, Department of Computer Science, University of North Carolina at Chapel Hill, pp. 1-11, XP055123062, Apr. 24, 2002.
Jason McC. Smith et al., "An Orthogonal Taxonomy for Hyperlink Anchor Generation in Video Streams Using OvalTine," Proceedings of the ACM Conference on Hypertext, pp. 11-18, XP002318371, 2000.
International Search Report for PCT/EP2014/077333 dated Jan. 26, 2015.

* cited by examiner

METHOD FOR ANNOTATING AN OBJECT IN A MULTIMEDIA ASSET

The present invention relates to annotating of objects in present in a multimedia asset.

Currently, placing informative and visually un-disturbing hyperlinks in multimedia assets such as images and video is not straightforward. For the moment, hyperlinks in images and video are always represented by a clickable, often squared, colored region floating on top of the actual image or video content. Content creators manually indicate regions (most often squared regions) which will hold the link. In the case of video content, they will also have to indicate the start- and end-frame for which the region holding the hyperlink will remain active. This results in a cumbersome process of adding hyperlinks to multimedia assets (images & video), of which above all this process still results in visually disturbing, unattractive and uninformative hyperlinks. Moreover, current hyperlink regions will not blend well into the visual content, and are not connected to the actual objects or persons present in the multimedia asset.

Nowadays, one has to add hyperlinks to a multimedia asset image & video content by just indicating a region (often squared) in the visual content that needs to be associated with the hyperlink. In the case of video, it is also required to indicate time-limits (start- and end-frame) during which the hyperlink holds.

As a first example, in the case of video content, think of the YouTube videos were one can place a link to a follow-up movie or to his own face book/home page. These links are always represented by colored, often squared regions in the video content placed at a static (non-moving) region in time. These can be quite annoying and visually unpleasing, mainly because they do not blend well into the content and are not linked to the content shown, but are just floating on top of the video.

As a second example, it is currently possible when constructing HTML web pages to manually indicate clickable regions inside images (not in videos). Here the content creator has to manually indicate the region and its location by using predefined forms (squares, circles, etc.) of using polygons, e.g. by listing all corner locations. This is again a cumbersome process which the content creator has to go through, and results are again visually unpleasing and uninformative if not taken care of.

An objective of the present invention is to provide a method for annotating an object in a multimedia asset of the above known type but which does not show the inherent and mentioned shortcomings of the prior art.

According to embodiments of the present invention this objective is achieved by a
method for annotating an object in a multimedia asset, said multimedia asset comprising at least one frame, said method comprising the steps of:
  determining a category of said object in an image of said multimedia asset by means of classifying said object; and
  selecting based on said category of said object an appropriate object detector model from at least one object detector model associated with said category; and
  determining a location of said object in said image of said multimedia asset based on said object detector model selected, said object detector model corresponding to said object; and
  segmenting said object detected in said frame of said multimedia asset based on said location of said object within said image and optionally based on said object detector; and
  Annotating said object being segmented in said frame with a hyperlink.

Correspondingly, embodiments of the invention relates to a Multimedia annotating Device for annotating an object in a multimedia asset, said multimedia asset comprising at least one image, said Multimedia annotating Device comprising:
  Categorizing means configured to determine a category of said object in an image of said multimedia asset by means of classifying said object; and
  Model management means configured to select based on said category of said object an appropriate object detector model; and
  Object detection means configured to determine a location of said object in said image of said multimedia asset based on said object detector model selected, said object detector model corresponding to said object; and
  Object Segmenting means, configured to segment said object in said image of said multimedia asset based on said location of said object within said frame and optionally based on said object detector; and
  Object Annotating Means, configured to annotate said object within said image being segmented, with a hyperlink.

In this way, by, determining for a certain object present in a single image or frame of the multimedia asset, a category of the object selected in the image of the multimedia asset, which determining of a category is based on the process of object classification, subsequently based on the category of the object, selecting an appropriate object detector model from at least one Object Detector model associated with the category of the object, which object detector model describing characteristics of the selected object, which step of selecting of the object detector model is followed by detecting a location of the object within the image or frame of the multimedia asset, where said object detector model that is selected corresponds to said object, and subsequently segmenting the object detected in the image or frame of said multimedia asset based on the location of the object within the image or frame and optionally based on the object detector model that is selected; and finally performing the step of factually annotating the object which is segmented in the frame with a hyperlink.

At first, a category of a certain object to be annotated within an image or frame of a to be annotated multimedia asset, is determined which selection of category may be based on classification of the object. Such classification of the object for instance may include a combination of the step of feature extraction (for instance implemented by means of SIFT, SURF, GIST, or other) being applied on the entire input image or frame, which step is followed by a statistical analysis of the outcome of the feature extraction, resulting in a representation that removes locality characteristics. As such an object may be anywhere in the image while it will still be detectable. This step of statistical analysis may be implemented by means of histogram creation using a 'bag of features' approach' or by means of 'Vector of Locally Aggregated Descriptors (VLAD). The step of statistical analysis is followed by the step of classification, which step of classification is based on the outcome of the statistical analysis of the outcome of the feature extraction, i.e. the process of extracting what specific statistics of the to-be-detected object has compared to the generic features (such as background and noise). The classification may be implemented by means of Support Vector Machine SVM classification or by means of neural networks being an alternative to SVM).

The Support Vector Machine SVM classification may be applied on a histogram resulting from the statistical analysis (which e.g. is implemented by means of bag of features approach), where Support Vector Machine SVM classification can be applied to classify an object to be detected. It is to be noted that classification does not return the location; it just detects whether an object is in an image or not which that makes classification interesting to do before a full detection (although not providing with the location).

This classification allows for object classes to be classified in the image. Subsequently, based on the determined category of the object an appropriate object detector model is selected, which object detector model describes characteristics of the object to be annotated.

The categorization and object detection steps should be seen as linked entities. The categorization step reduces the number of object detectors that need to be tested on the image data to determine whether they are applicable or not. This means that the categorization step will—in general—output more generic object classes (e.g. a "human"). Such an object class is then linked with object detector models, which are subsequently linked to each other in a parent-child fashion. More generic object detector models have 'children' that are more specific instances of this model. E.g. a model 'human' can have children 'female' or 'male', and these can also have children such as respectively 'Angelina Jolie' and 'Brad Pitt'. This model metadata can be provided by manual means (human operator), or can be done in an automated manner.

The automated manner will make a more specific instance of a certain model when sufficient specific samples were given, while the other samples also maintain the 'generic' part of the model.

An object detector model describes the object in all its variations. There is an n-to-1 link between the object detector model and the object detector; i.e. multiple models can use the same detector. The detector is the mechanism of how to use/fit/update/etc. the model with regards to the input. The detector defines the mechanism, while the detector model defines a specific instantiation of such a detector (e.g. an 'Angelina Jolie detector model', a 'bicycle detector model' etc.

After the determination of the object detector model, a location of the, to be annotated object within the frame or image of the multimedia asset is determined, where the determining of the location is based on the selected object detector model which object detector model corresponds to the, to be annotated object. Such location may be a region within the frame or image of the multimedia asset wherein the object to be annotated is detected.

Once at selection of the appropriate object detector, the location of the object is determined based on the object detector model that is associated with the meant object, which location being determined in a step ahead is applied for segmenting the object. Such location may be a region within the frame of the multimedia asset wherein the object to be annotated is detected.

The determination of such location may be performed in a window-based manner wherein the input frame or—image is overlayed with a number of test-windows, where such windows do include instantiations of an object detector model selected in accordance with determined category, at multiple locations and scales.

The object detection algorithm is executed on each of these windows in order to detect instantiations of the selected object detector model. If a good match is found, the object is considered recognized and the corresponding window is returned.

A common object detection algorithm involves the construction of a Histogram of Gradients HOG on the window; this is a more global feature when compared to SIFT or SURF as it combines information from the complete window. Support Vector Machine SVM can then again be applied to classify the detection of an object. If an object is detected, the location of the object is thus known due to the knowledge of the selected window location.

Another popular approach (as proposed by Viola and Jones) involves the construction of Haar features, using well-known Haar basis functions, classifying these features effectively using Adaboost and employing a cascade approach in order to facilitate fast evaluation. http://en.wikipedia.org/wiki/Viola%E2%80%93Jones_object_detection_framework Considering, the object detector model of the, to be annotated object and the location of the object within the image or frame, the object first is segmented, meaning that the object is separated from the entire content of the frame or image, i.e. from the other objects of the whole frame of the multimedia asset and finally this segmented object may be annotated with a hyperlink.

This object segmenting of this meant object may be performed based on the similarity of color and/or texture of the meant object within the image, i.e. at the determined location of the object within the frame. Regions with equal color and/or texture are assumed to be part of the same segment. As such, one may apply such a segmentation algorithm (popular choices include the 'watershed' approach and k-means clustering) on the location, i.e. for instance the region within the frame or image wherein the object to be annotated is detected, and keeping the segments that do not cross this region).

Alternative solutions for object segmenting may use additional information from the object detector in order to more accurately segment the object. If, for example, a skeleton structure ('stick structure') is available along with the detected region of a human person, it is possible to use this skeleton as a starting point for the segmentation algorithms. One will grow the segments starting from this skeleton, and end when a boundary is reached.

In addition, it is possible to use the consistent movement of the segmented data over multiple frames (if such object is detected over multiple frames) to refine the segmentation result.

The annotating may imply that a hyperlink or a Uniform resource Locator URL is coupled to the segmented area of the object to be annotated.

An annotation is metadata (e.g. a comment, explanation, presentational markup) attached to text, image, or other data. Often annotations refer to a specific part of the original data. Any type of data, the 'metadata', can be attached to—in this case—a specific part of the image. The annotation link that couples a certain part of the image—with associated object detector model—to the metadata can be created by various means. In the most simple manner, a human operator decides what metadata needs to be linked to which object detector model. As such, this human operator makes the link between the object in the image (which is known by the object detector model and the metadata; e.g. an URL to be opened in a browser, a link a different video to be played next, a link to a different storyline in the same video, etc.

In other embodiments, the link can be used from earlier input data (e.g. data that a human operator had input in earlier processing of video sequences) or in an automated manner by employing crowd sourced data (e.g. do a Google-image search with an instance of the image data), and using the associated data to determine interesting side-information such as internet Movie database (IMDB) pages of the actors, or Wikipedia pages.

Alternatively, a link pointing at some meta-data can be included in the object detector model, where this included link information may be applied for annotating the meant object.

Furthermore, the step of segmenting the object factually being the delineating of the shape of the object to be annotated and optionally marking this boundary. In this manner the object to be annotated can, under certain conditions, be visually separated from the other objects and background of the frame of the multimedia asset. For instance, as the user pauses the content, regions containing hyperlinks can be highlighted by e.g. a white border around the segmented and tracked object. Optionally feedback can be given to the user when hovering over a segmented and annotated region, where the white border is replaced by e.g. a red border around the object. Other possibilities and combinations are possible but not listed here. Note that, depending on the application, the choice can be made to only show hyperlink visualizations when the user executes a certain action (e.g. pause a movie to know more about a certain actor). In other applications, the augmented hyperlink visualizations can be shown when the content author wants them to be shown only.

The annotation of objects is better manageable and more easy to perform over the prior art solutions as first the object to be annotated is optimum detected by using a most appropriate object detector model which choice is optimized by classifying the object to be annotated. If the object to be annotated is optimum detected the location of the object within each frame can be optimally determined giving the step of segmentation an optimum input for delineating the shape of the object, which delineated shape further may be applied for the final annotation of the delineated object.

An additional advantage of the method according to the present invention is that the annotation of the object has an improved presentation due to the improved blending of the annotation into the content and consequential linking of the annotation to the object to be annotated as a consequence of the optimum delineated shape of the object.

An additional advantage of embodiments of the present invention is that it is becoming feasible to couple hyperlinks to detected and segmented objects in the visual content where this hyperlink region may evolve based on the movement and transformations/deformations of this object within the visual content.

A further embodiment of the present invention is selecting a region of said frame or image including at least a fragment of said object (said object being associated with a category); and extracting an Object Detector model based on image information in said region of said frame or image including at least said fragment of said object, said image in said region being obtained from said image in said region being obtained during said step of determining a location of said object in said image of said multimedia asset based on said object detector model selected. If there is no object detector model available for a certain object, a new object detector model is created by selecting a region of said frame or image including at least a fragment of the object, where the object is associated with a category, and subsequently extracting an Object Detector model based on image information in the region of said frame or image including at least the fragment of said object, said image in said region being obtained from said object detection means, a new object detector model is created which may be applied for the annotating of next similar objects.

The region of said frame or image including at least a fragment of said object after selection is categorized, i.e. a certain category is assigned to the object within the selected region.

Subsequently, the said region including the at least a fragment of an object in the frame or image is selected, for which at least the fragment of the object is used to create a new detector model. Multiple input images are possible (depicting the same object) in which case multiple accompanying regions should be selected.

The image region may be transformed into the format that is expected by the detector (e.g. into the Histogram of gradients format, HOG format).

The extraction of an object detector model based on image information in the said region is the extraction and modeling of certain properties of the object that is shown in one or more of the image regions. These modeled properties can later be used to detect whether the object is present in a certain image region. More specifically, object detector models can be split into 2 main categories. A first category consists of image-based models that attempt to model the object indirectly by using features in the projective image representation (2D). In this category, object detector model extraction usually consists of a feature extraction step followed by a feature modeling step, in which the feature modeling step can consist of statistical methods, example-based methods or others. A second category consists out of geometry-aware models that model the object in the 3D space. With these techniques, a geometric model is fitted and adapted in order to better match the input data. As such, one creates a new hypothesis from an existing one (which can be very generic) in order to match the indirect measurement (the 2D image data) better.

Still another embodiment of the present invention is training said Object Detector model corresponding to said object detector based on image information extracted from said region of said frame or image including at least said fragment of said object.

In this way, an existing object detector model for a certain object, in a certain category, is improved by, for a selected region of a frame or image that includes at least a fragment of the meant object, based on image information extracted from this selected region of the frame or image that includes at least the fragment of the object, training the corresponding Object Detector model corresponding to said object detector.

At first, a selected region is detected by the model detector, and the detector can be updated to refine its model. A matching score, being a score indicating a the difference between the input data, obtained from the detected region, and the fitted detector model is returned by the detector, and a choice is made whether or not the region should be used to update the detector.

The image within the selected region is transformed into the format that is suitable for the object detector (e.g. HOG format). Subsequently, the current, to be trained, object detector model is updated by adding image information with respect to the selected region to the training set which training information is either pre-determined (input to the method), or is gradually built using the aforementioned method.

A further embodiment of the present invention is tracking said location of said object in each frame of a plurality of frames of said multimedia asset.

In this way, by for each frame or image of a plurality of frames or images included in said multimedia asset, the location of an object is determined and tracked throughout each of the images of the multimedia asset and based on the location in each of the subsequent images in multimedia asset these locations can be compared with each other. This tracking may be applicable for correcting the determination of the location of said object in said frame or image of said multimedia asset but alternatively may be applied for following a moving object and possibly changing shape or form of the object.

Hyperlinks can be coupled to these segmented and tracked regions, producing hyperlink regions closely resembling the object and following the object's deformation and movement throughout the whole content of the multimedia asset in case of e.g. a movie.

In case the location of the object within a certain image of the plurality of images is not within the expected range, an error may have occurred. This erroneous determination of the location of the object within the certain image may be corrected based on the location of the object in predecessor images and successor images of this certain image with erroneous location determination.

Moreover, tracking of an object within in each frame of a plurality of frames of said multimedia asset allows to follow a moving object and possibly changing shape or form within a multimedia asset like a movie and keep annotating such an object during the period in which the to be annotated object is present within the frame.

Still another embodiment of the present invention is that said annotating additionally includes the adding of a condition for presentation of said object being segmented and being annotated with said hyperlink.

In this manner, the object to be annotated can, under certain conditions, be visually separated from the other objects and background of the frame of the multimedia asset. For instance, as the user pauses the content, regions containing hyperlinks can be highlighted by e.g. a white border around the segmented & tracked object. Optionally feedback can be given to the user when hovering over a segmented and annotated region, where the white border is replaced by e.g. a red border around the object.

Other possibilities and combinations are possible but not listed here. Note that, depending on the application, the choice can be made to only show hyperlink visualizations when the user executes a certain action (e.g. pause a movie to know more about a certain actor). In other applications, the augmented hyperlink visualizations can be shown when the content author wants them to be shown only.

Still another embodiment of the present invention is that said hyperlink is a Uniform Resource Locator URL or alternatively, an alternative storyline in the video or displaying additional information on the video in a video overlay (instead of opening a link on an external application such as a browser.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 3:
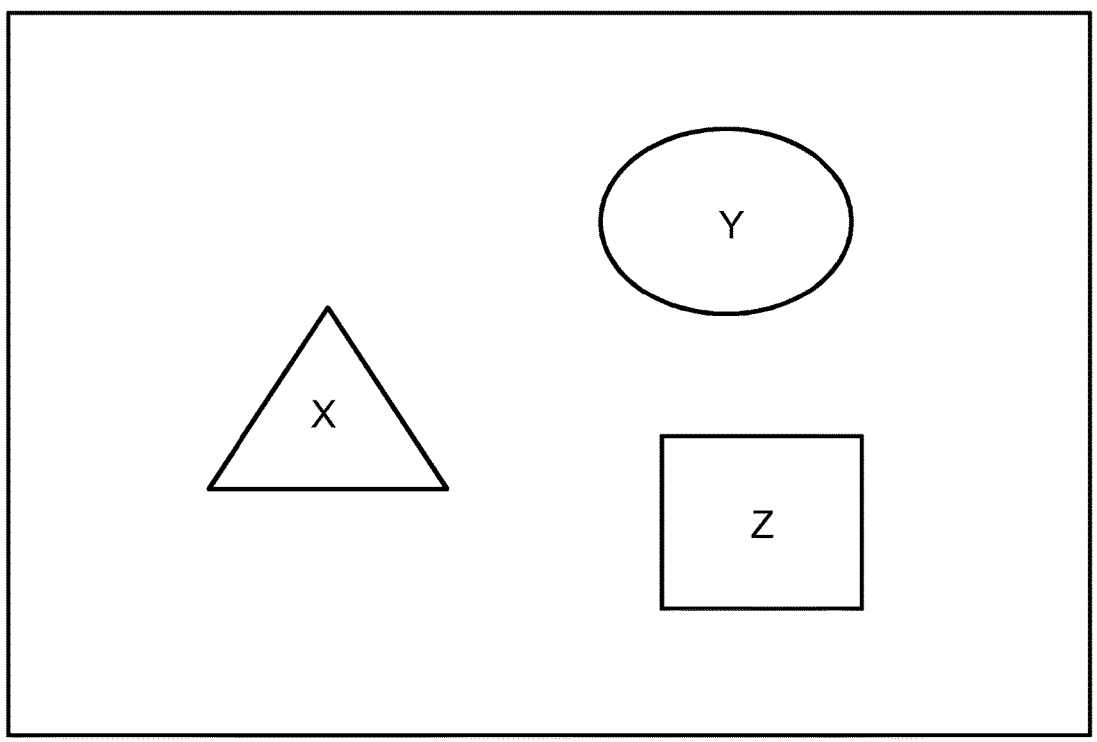

FIG. 3 displays a single image of a multimedia asset, in which objects to be annotated are represented by X, Y, and Z, respectively, for reasons of simplicity.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
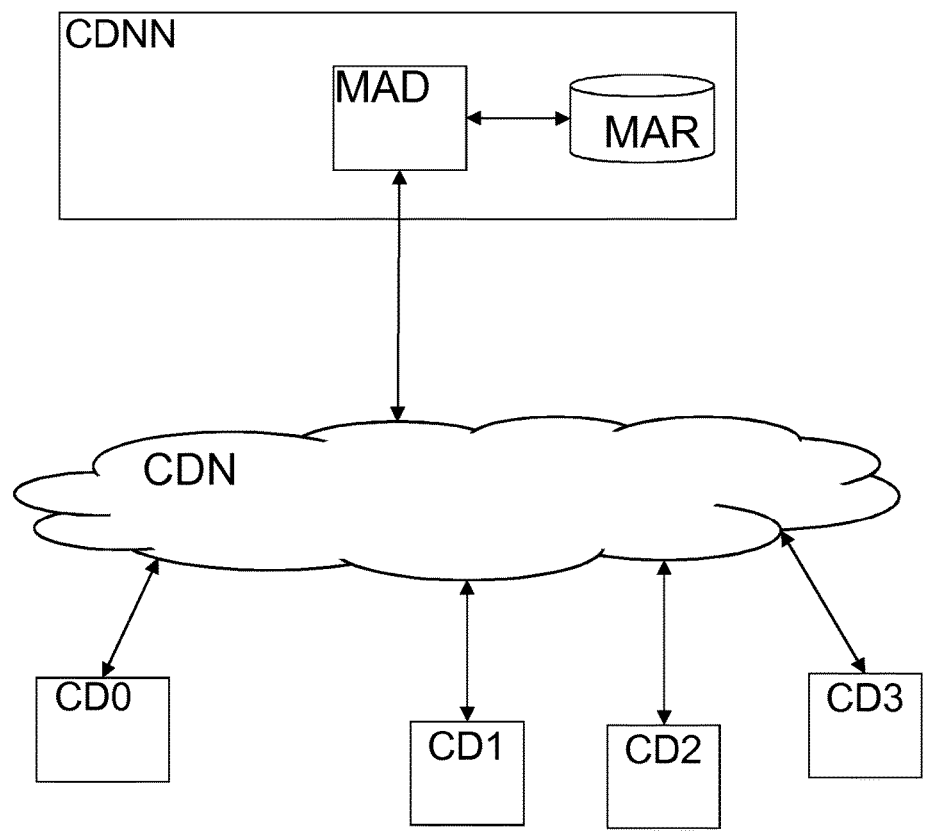
FIG. 1 represents a functional representation of an embodiment of the system for annotating objects in a multimedia asset.

In the following paragraphs, referring to the drawing in FIG. 1, an implementation of the system is described. In the second paragraph, all connections between mentioned elements are defined.

Figure 2:
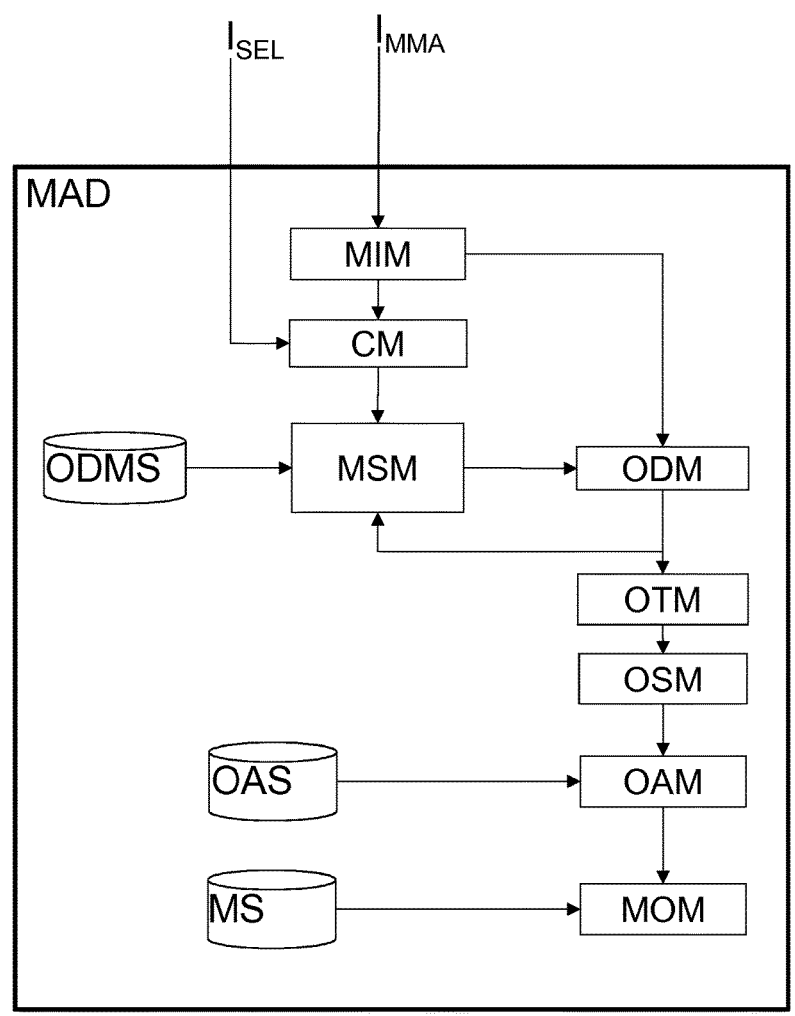
FIG. 2 represents a functional representation of an embodiment of the multimedia annotating device according to the present invention.

Subsequently, all relevant functional means of the mentioned system as presented in FIG. 2 are described followed by a description of all interconnections. In the succeeding paragraph the actual execution of the system is described.

A first essential element of the system is a content delivery network node CDNN being a server in a content delivery network CDN for providing coupled user communication devices CD0, . . . , CD3 with multimedia content such as video and or pictures.

Further the system includes a plurality of user communications devices CD0 . . . CD3. Although such a content delivery network usually includes a large number of such user communication devices CD1, in this embodiment for sake of simplicity only communication devices CD0, . . . , CD3 are described and depicted in FIG. 1.

Such user communications device CD0, . . . , CD3 may be a personal computer, a television screen coupled to a set top box, a mobile communications device e.g. a smart-phone etc each of such devices having a screen with or without speakers for watching such multimedia contents video content such as video or pictures or with capabilities and means for watching video content and or pictures. Additionally such, communications device may additionally have means for selecting hyperlinks in such video content and/or pictures and means for fetching and presenting this content pointed at by the hyperlinks.

The content delivery network node CDNN may be a network node giving end-users amongst others access to a large fraction of the Internet content today, including web objects (text, graphics and scripts), downloadable objects (media files, software, documents), applications (e-commerce, portals), live streaming media, on-demand streaming media, and social networks.

The content delivery network node CDNN further includes the multimedia asset annotation device MAD, according to the present invention, for annotating an object in a multimedia asset.

Further, each of the user communication devices CD0, . . . , CD3 are coupled to the content delivery network node CDNN over a content delivery network including broadband networks or any other suitable network The Multimedia annotating Device MAD for annotating an object in a multimedia asset first comprises a Multimedia asset input means MIM configured to input a multimedia asset such as video asset or a picture. Such Multimedia asset input means MIM may receive a multimedia asset input by an operator for explicitly annotating such multimedia asset or automatically receive a multimedia asset added to a database holding such multimedia assets. Further, the Multimedia annotating Device MAD comprises a Categorizing means CM that is configured to determine a category of said object in a frame or image of said multimedia asset by means of classifying said object, a Model management means MSM that is configured to select based on said category of said object an appropriate object detector model and a Object detection means ODM that is configured to determine a location of said object in said frame or image of said multimedia asset based on said object detector model selected, said object detector model corresponding to said object.

The Multimedia annotating Device MAD additionally may include an object detector model storage e.g. being database for holding object detector models organized per object classification. As an alternative this storage may be located externally to this Multimedia annotating Device MAD.

Further the Multimedia annotating Device MAD comprises an Object Segmenting means OSM that is configured to segment said object in said frame or image of said multimedia asset based on said location of said object within said frame and optionally based on said object detector and an object Annotating Means OAM that is configured to annotate said object within said frame or image being segmented with a hyperlink.

The Multimedia annotating Device MAD further may include an object annotation storage OAS, e.g. being database for holding annotations to the, to be annotated objects where such annotation is metadata (e.g. a comment, explanation, presentational markup) to be attached to text, image, or other data. Often annotations refer to a specific part of the original data. Any type of data, the 'metadata', can be attached to—in this case—a specific part of the image. The link annotation link that couples a certain part of the image—with associated object detector model.

Moreover, the Model management means MSM further is configured to:
 select a region of said frame or image including at least a fragment of said object said object being associated with a category; and
 extract an Object Detector model based on information on said image in said region of said image or frame including at least said fragment of said object, said information on said image in said region being obtained from said object detection means ODM.

The Model management means MSM further is configured to train said Object Detector model corresponding to said object detector based on image information extracted from a region of said frame or image including at least said fragment of said object. The Multimedia annotating Device MAD further may include an object detector model storage e.g. being database for holding object detector models organized per object classification.

The Multimedia annotating Device MAD optionally includes an object tracking means OTM that is configured to track said location of said object in each frame of a plurality of frames of said multimedia asset.

Finally the Multimedia annotating Device MAD may comprise a multimedia asset outputting means MOM that is adapted to output the annotated multimedia assets such as a video or picture to a an operator or adding the annotated multimedia asset to a database holding such multimedia assets such as multimedia asset storage means MS. Such annotated multimedia assets held by such a database are available for retrieval by the end-users e.g. by means of the respective user communications devices.

In order to explain the execution of the present invention it is supposed that a certain multimedia asset MA being a YouTube music video or a including musicians x, y and z or a movie including actors X, Y and Z, is to be annotated with hyperlinks to a web page of the respective actor. Each of the actors is represented in FIG. 3 which displays a single image of a multimedia asset, by respective objects X, Y, Z for reasons of simplicity. It is obvious that each of the actors has a number of characteristics, differing over each other.

In the following, the annotation of actor X is described. The execution and the principle of the annotation of the other objects being actors Y and Z is similar to that of actor X.

The Media asset MA is input to the Multimedia asset input means MIM of the Multimedia annotating Device MAD.

The multimedia asset MA is provided to the Multimedia asset input means MIM by an operator for explicitly annotating such multimedia asset or provided automatically by a multimedia repository MAR holding the multimedia asset MA. The Multimedia asset input means MIM forwards the multimedia asset MA towards the Categorizing means CM that is configured to determine a category of said object X, i.e. female actor X with a first image of the multimedia asset MA.

The Categorizing means CM analyzes object X, being the female actor X and based on 'the detected distinct features' it is determined that object X is of object class people; female; actor. The categorization means CM performs the classification of object X being actress X by means of feature extraction applying for instance SIFT, SURF, GIST, or other) being applied on the entire input image included in the image or frame of the multimedia asset. The outcome of the executed feature extraction is a set of features such as SIFT (Scale-invariant feature transform), SURF (Speeded Up Robust Features), GIST, etc. are feature types, with the associated methods to extract them. As such, the features are 'SIFT features', 'SURF features', 'GIST features', etc.

Subsequently, this set of features is statistically analyzed by means of histogram creation using a 'bag of features' approach which results in a: locality-invariant features description.

Based on this locality-invariant features description a classification is performed which for instance may be performed by means of Support Vector Machine SVM classification. The Support Vector Machine SVM classification is applied on a histogram resulting from the bag of features approach and resulting in that the category of object X is the category of female actors.

Subsequently, the Categorizing means CM forwards the first image of the multimedia asset MA, together with the object class determined, and the determined features: i.e. people; female; actor towards the Model management means MSM that is configured to select based on said category of said object an appropriate object detector model.

Based on the determined object class for object X the most appropriate object detector model is selected from the object detector model storage ODMS, being object detector model actress X. Alternatively more than one object detector model may be selected for detecting an object.

The selected object detector model subsequently is notified and forwarded to the Object detection means ODM that is configured to determine a location of said object X within said first image of the multimedia asset MA based on the selected object detector model, where the object detector model corresponds to the object X.

The object detector module based on instantiations of the selected object detector model being the actress X object selector model, positioned within the test-window is overlayed on the image including the mentioned object X, i.e. actress X. The selected object detector model actress X is tried to be matched with object X in the image and if a good match is found, the object is considered recognized and the corresponding window is returned, i.e. added to the output result.

The object detector model determines the location, e.g. the region wherein object X resides by trying to match image patches (i.e. portions of the input image) at different sizes and scales are tested in order to determine the level of correspondence between the fitted object detector model and the image information.

Model fitting can be done in 2 ways—forward fitting where the object detector model parameters are adapted, a visualization is made and this visualization is compared to the actual input data after which the parameters are refined. Backward fitting starts from the input data, and attempts to find the model parameters directly from this data. Both techniques are frequently used, and the choice depends on the chosen modeling technique. The level of correspondence that is returned is—in most cases—a value that can be a threshold in order to obtain a binary decision that indicates whether or not the object is detected.

Subsequently the Object detection means ODM forwards the first image together with the location of object X and towards the Object Segmenting means OSM that is configured to segment the object in the first image of the multimedia asset based on said location of the object X within the first image. Optionally the information from the selected object detector model can be applied for aiding/refining the object segmenting process. A per-pixel confidence value could for example be given by the object detector model that indicates what the chance is that a certain pixel is part of the detected object. These chances can then be used in the segmenting process. Another possibility is that a skeleton-based model is provided by the object detector model. This skeleton can then be used as a seed for incremental segmentation algorithms (e.g. to select seed points for a watershed algorithm).

This segmenting of this meant object hence may be performed based on the likeliness of the color and/or texture of the object detector model corresponding to the object X is detected within the image at the determined location of the object within the frame. Moreover, for regions with equal color and/or texture it is assumed in this process of segmenting that this forms part of the same segment. Hence, the object segmenting means OSM based on the earlier determined location of object X and the information obtained from the object detector model (e.g. color and/or texture information), the mentioned object corresponding to the object detector model is delineated from the background of the image by coloring the outer border of the object, i.e. actress X and optionally filling the object.

Further, the segmented area of object X within image is forwarded by object segmenting means OSM and the location thereof, together with the full first image towards the object Annotating Means OAM that is configured to annotate said object within this first image being segmented with a hyperlink. The forwarding of the segmented area which may be performed by the use of a bitmask which indicates for each pixel whether or not it forms part of the object.

An annotation includes metadata (e.g. a comment, explanation, presentational markup) attached to text, image, or other data. Often annotations refer to a specific part of the original data. Any type of data, the 'metadata', can be attached to—in this case—a specific part of the image. The link annotation link that couples a certain part of the image—with associated object detector model—to the metadata can be created by various means. In the most simple manner, a human operator decides what metadata needs to be linked to which object detector model. As such, this human operator makes the link between the object in the image (which is known by the object detector model and the metadata; e.g. an URL to be opened in a browser, a link a different video to be played next, a link to a different storyline in the same video, etc.

In other embodiments, the link can be used from earlier input data (e.g. data that a human operator had input in earlier processing of video sequences) or in an automated manner by employing crowd sourced data (e.g., do a Google-image search with an instance of the image data), and using the associated data to determine interesting side-information such as internet Movie database (IMDB) pages of the actors, or Wikipedia pages. Alternatively, a link pointing at some meta-data can be included in the object detector model, where this included link information may be applied for annotating the meant object.

The chosen hyperlink could be stored in an object annotation storage OAS, e.g. being database for holding annotations to the to be annotated objects where such annotation is metadata (e.g. a comment, explanation, presentational markup) to be attached to text, image, or other data. Often annotations refer to a specific part of the original data. Any type of data, the 'metadata', can be attached to—in this case—a specific part of the image. The link annotation link that couples a certain part of the image—with associated object detector model.

As the annotation is performed for a first image of the multimedia asset MA, this can be done in the same manner for each subsequent image of the full multimedia asset MA.

Finally the fully or partially annotated multimedia asset MA can be handed over to the multimedia outputting means, that is able to forward the annotated multimedia asset to an end user or store the annotated multimedia asset in a multimedia asset repository MAR for later use.

An additional embodiment of the present invention is that initially there is no object detection model present for a certain object, say object X.

If there is no object detector model available for a certain object, a new object detector model is created by selecting a region of the first image of the multimedia asset MA including at least a fragment of the object X, where the object first is associated with a category, i.e. people; female, actress and subsequently an Object Detector model is extracting based on image information in the region of the first image including at least the fragment of the object, i.e. object X, said image in said region being obtained from said object detection means, a new object detector model is created which may be applied for in the annotating of next similar objects.

The region of said frame or image including at least a fragment of said object after selection is categorized, i.e. a certain category is assigned to the object within the selected region.

Subsequently, the said region including the at least a fragment of an object in the frame or image is selected, for which at least the fragment of the object is used to create a new detector model. Multiple input images are possible (depicting the same object) in which case multiple accompanying regions should be selected.

The image region may be transformed into the format that is expected by the detector (e.g. into the Histogram of gradients format, HOG format).

The extraction of an object detector model based on image information in the said region is the extraction and modeling of certain properties of the object that is shown in one or more of the image regions. These modeled properties can later be used to detect whether the object is present in a certain image region. More specifically, object detector models can be split into 2 main categories. A first category consists of image-based models that attempt to model the object indirectly by using features in the projective image representation (2D). In this category, object detector model extraction usually consists of a feature extraction step followed by a feature modeling step, in which the feature modeling step can consist of statistical methods, example-based methods or others. A second category consists out of geometry-aware models that model the object in the 3D space. With these techniques, a geometric model is fitted and adapted in order to better match the input data. As such, one creates a new hypothesis from an existing one (which can be very generic) in order to match the indirect measurement (the 2D image data) better.

If an operator does manually indicate an object which cannot be classified (no objects were recognized), a new object detector model is created using the manually annotated data as training data, and a classifier is also trained on this data. Optionally, one can try all (generic) object detectors first before creating a completely new object detector in order to deal with possible classification errors (i.e. that the classifier did not correctly detect the object). This is a computationally expensive operation however (no filtering of the object detector models by the classification).

During classification an object class detected which object class is linked to a set of object model detectors. The detectors are executed from generic to specific (e.g. human-→women→actress X). The linkage information between classification and detector models can be done manually, but it could be done automatically by analyzing the detections of the different models. This is possible because the classification merely specifies a subset of the detector models that should be executed. It is thus not a problem to initially provide a larger subset, and automatically refine this subset according to the detection results. As said before however, usually this linkage is done in a manual manner (e.g. linking the 'human' classifier with the generic 'human' detector model).

Still a further embodiment of the present invention is that the Model management means MSM further is configured to train the selected Object Detector model corresponding to the object X where the object detector model is based on image information extracted from a region of the first image of the multimedia asset that includes at least a fragment of the object X. The Multimedia annotating Device MAD further may include an object detector model storage ODMS e.g. being a Repository for holding object detector models that are organized per object classification.

Another further alternative embodiment of the present invention is that the Multimedia annotating Device MAD optionally includes an object tracking means OTM that is configured to track said location of said object in each frame of a plurality of frames of said multimedia asset.

The tracking step is used for tracking objects in consecutive video frames. This step is optional, and can be used to improve robustness of the object detector output by imposing a temporal model on the consecutive object locations (windows). This reduces the influence of erroneous object detections. When a detected object is first received by the tracker, it will initialize a state that represents the evolution of the movement of this object through time. This state is saved during the 'lifetime' of this object. Note that the 'lifetime' does not necessarily mean the duration of which the object is in the image. An object might disappear out of the image, and re-enter moments later. It is the responsibility of the tracker to decide when to remove the state data of the objects. In practice, this behavior can be controlled by a parameter that represents a notion of timeout—the time it takes for a hidden object to be 'forgotten' (which is usually fixed at the deployment stage). While basic tracking algorithms focus on tracking a single object, extensions are available to expand these to multiple-object tracking. In general, tracking involves the following steps. The input consists out of the current frame, and the location where the object was in the previous frame and the estimated location of the object in the current frame (output from the object detector). An appearance model is then used that describes the visual characteristics of the tracked object. A so-called mode-seeking operation is then performed to search for the new location where the object resides in the new input image, taking into account the appearance model, the input frame, and the previous and currently estimated location.

Frequently used tracking techniques include mean-shift tracking (iterative optimization of a similarity measure) and the more complex Kalman-based trackers (incorporating prediction on the future location of the tracked object). These are well-known techniques in the domain of appearance-based object tracking.

The position of the detected object may be fed to an object tracking means OTM that is configured to track the location, i.e. the region wherein object X resides in, for each image of a plurality of images of the multimedia asset MA.

A stable tracked object position then is forwarded to the object segmentation means OSM, which nicely segments out the pixels corresponding to the object from the surrounding background, making it possible to nicely fit the hyperlink annotation to the object (and only to the pixels of the object.

Also in the case of automatic addition of hyperlinks without manual interaction (see second embodiment) or in the case where the object went out of screen for a specific time and later on comes back in screen, object detector models need to be stored somewhere for later usage.

It is to be noted that although the described embodiment deals with a content delivery network any kind of delivery network could be applied or embodiments of the present invention can be a personal computer including such a multimedia content annotating device, of a certain user that annotates his own movies before posting the movie at YouTube or other equivalent video or picture services.

Further alternative embodiments of the present invention could be the integration of the system in a fully automated hyperlink augmentation service where the content in a CDN is automatically augmented with information that is known to the system. Actors could thus be annotated with relevant hyperlinks for all content of the CDN in an automated manner. For actors that are unknown to the system, a correlation between the learned detector and other available information sources can be made in order to still provide relevant annotations in an automated manner (e.g. extract visual information from Wikipedia or imdb.com and match it to the unknown actors). Alternatively, a human operator can log into the system in order to add new actors as they become more popular.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for annotating an object in a multimedia asset, said multimedia asset comprising at least one image, said method comprising:
   determining a category of said object in an image of said multimedia asset based on classifying said object by extracting features from said image and performing a statistical analysis on said extracted features to identify one or more object classes associated with said object;
   selecting, based on said category of said object, an object detector model from a plurality of object detector models associated with said category of said object, said selected object detector model describing specific characteristics of said object;
   determining a location of said object within said image of said multimedia asset, said location of said object being a region within said image in which said object is detected based on said selected object detector model corresponding to said object;
   segmenting said object detected in said image of said multimedia asset, based on (i) said location of said object within said image and (ii) said selected object detector model, by delineating a shape of said object and marking a boundary of said object, said marked boundary enabling said object to be visually separated from background and other objects within said image; and
   automatically annotating said segmented object in said image (i) with a hyperlink, and (ii) by adding a condition for visual presentation of said segmented object, based on said marked boundary of said object within said image.

2. The method according to claim 1, said method further comprising:
   selecting at least one region of said image including at least a fragment of said object; and
   extracting a new object detector model based on image information in said at least one region of said image including at least said fragment of said object, said image information in said at least one region being obtained during said determining said location of said object within said image of said multimedia asset based on said selected object detector model.

3. The method according to claim 1, said method further comprising:
   detecting at least one region of said image including at least a fragment of said object; and
   training said selected object detector model corresponding to said object based on image information extracted from said at least one region of said image including at least said fragment of said object.

4. The method according to claim 1, said method further comprising tracking said location of said object in each image of a plurality of images of said multimedia asset.

5. The method according to claim 1 wherein said hyperlink is a uniform resource locator (URL), or displays additional information on said image in an overlay.

6. A multimedia annotating device for annotating an object in a multimedia asset, said multimedia asset comprising at least one image, said multimedia annotating device comprising:
   a memory storing computer-readable instructions; and
   a processor configured to execute the computer-readable instructions to,
      determine a category of said object in an image of said multimedia asset based on classifying said object by extracting features from said image and performing a statistical analysis on said extracted features to identify one or more object classes associated with said object;
      select, based on said category of said object, an object detector model from a plurality of object detector models associated with said category of said object, said selected object detector model describing specific characteristics of said object;
      determine a location of said object within said image of said multimedia asset, said location of said object being a region within said image in which said object is detected based on said selected object detector model corresponding to said object;
      segment said object detected in said image of said multimedia asset, based on (i) said location of said object within said image and (ii) said selected object detector model, by delineating a shape of said object and marking a boundary of said object, said marked boundary enabling said object to be visually separated from background and other objects within said image; and
      automatically annotate said segmented object in said image (i) with a hyperlink, and (ii) by adding a condition for visual presentation of said segmented object, based on said marked boundary of said object within said image.

7. The multimedia annotating device according to claim 6, wherein said processor is further configured to execute the computer-readable instructions to:
- select at least one region of said image including at least a fragment of said object; and
- extract a new object detector model based on information in said at least one region of said image including at least said fragment of said object, said information in said at least one region being obtained during said determining said location of said object within said image of said multimedia asset based on said selected object detector model.

8. The multimedia annotating device according to claim 6, wherein said processor is further configured to execute the computer-readable instructions to:
- detect at least one region of said image including at least a fragment of said object; and
- train said selected object detector model corresponding to said object based on image information extracted from said at least one region of said image including at least said fragment of said object.

9. A network element comprising a multimedia annotating device according to claim 6.

* * * * *